US006851463B1

(12) United States Patent
Socci et al.

(10) Patent No.: US 6,851,463 B1
(45) Date of Patent: Feb. 8, 2005

(54) COMPOSITE COMPRISING ORGANIC FIBERS HAVING A LOW TWIST MULTIPLIER AND IMPROVED COMPRESSIVE MODULUS

(75) Inventors: Edward Peter Socci, Stewartsville, NJ (US); Young Doo Kwon, Mendham, NJ (US); Charles Jay Nelson, Richmond, VA (US); Thomas Hoyt Golden, Denville, NJ (US); Jeffrey Donald Pratt, Budd Lake, NJ (US); Uday Bharatkumar Jhaveri, Westfield, NJ (US)

(73) Assignee: AlliedSignal Inc., Morristown, NJ (US)

( * ) Notice: Subject to any disclaimer, the term of this patent is extended or adjusted under 35 U.S.C. 154(b) by 0 days.

(21) Appl. No.: 09/288,589

(22) Filed: Apr. 8, 1999

(51) Int. Cl.[7] .............................. B60C 9/00; B60C 9/20; B60C 9/22; B60C 9/26; B32B 5/12

(52) U.S. Cl. ..................... 152/527; 152/451; 152/526; 152/528; 152/531; 152/533; 152/535; 156/123; 428/105; 428/295.4; 428/395

(58) Field of Search .................... 152/451, 527, 152/556, 533, 526, 531, 535, 528; 428/105, 295.4, 297.1, 394, 395; 156/123

(56) References Cited

U.S. PATENT DOCUMENTS

| | | |
|---|---|---|
| 3,473,594 A | 10/1969 | Mirtain |
| 3,616,832 A | 11/1971 | Shima et al. |
| 3,623,927 A | 11/1971 | Watson |
| 3,663,330 A | 5/1972 | Sager |
| 3,830,276 A | 8/1974 | Smithkey, Jr. |
| 3,854,515 A | 12/1974 | Takemura et al. |
| 3,863,695 A | 2/1975 | Mirtain |

(List continued on next page.)

FOREIGN PATENT DOCUMENTS

| | | | |
|---|---|---|---|
| EP | 0 965 463 A2 | 12/1999 | |
| GB | 1 310 316 A | * 3/1973 | ................. 152/527 |
| GB | 1445464 | 8/1976 | |
| JP | 62-156312 | 7/1987 | |
| JP | 5-319018 | 12/1993 | |
| JP | 7-310251 | 11/1995 | |
| JP | 8-276704 | 10/1996 | |
| JP | 9-30210 | 2/1997 | |
| JP | 9-142101 | 6/1997 | |
| JP | 9-193608 | 7/1997 | |
| WO | WO 98/14336 | 4/1998 | |
| WO | WO 98/47726 | 10/1998 | |
| WO | WO 99/16630 | 4/1999 | |

OTHER PUBLICATIONS

U.S. patent application Ser. No. 60/128,280, Glaser, filed Apr. 8, 1999.

U.S. patent application Ser. No. 09/312,794, Glaser, filed May 17, 1999.

"Mechanical Properties of 3–D Composites" by M. Cholakara, B.Z. Jang, and C.Z. Wang, Antec '89, pp. 1549–1551.

Search Report for PCT/US 00/09565.

*Primary Examiner*—Adrienne C. Johnstone
(74) *Attorney, Agent, or Firm*—Margaret S. Millikin; Virginia Szigeti

(57) ABSTRACT

The present invention provides an improved fiber-reinforced article comprised of at least two plies. Each of the plies comprises (a) rubber and (b) cord made from melt-spinnable, non-metallic, multifilament fibers for which the cord has a twist multiplier of less than or equal to about 375, a stress at 1% strain greater than or equal to about 1.7 grams/denier, and an initial compressive modulus greater than or equal to about 7 grams/denier, and the at least two plies have a fiber orientation angle of greater than or equal to about 23°. The composite is useful as a tire belt in a passenger tire.

28 Claims, 9 Drawing Sheets

U.S. PATENT DOCUMENTS

| | | |
|---|---|---|
| 3,929,180 A | 12/1975 | Kawase et al. |
| 4,210,189 A | 7/1980 | Brown, Jr. |
| 4,331,495 A | 5/1982 | Lackman et al. |
| 4,830,781 A | 5/1989 | Oswald |
| 5,185,195 A | 2/1993 | Harpell et al. |
| 5,198,280 A | 3/1993 | Harpell et al. |
| 5,211,609 A | 5/1993 | Haines |
| 5,246,051 A * | 9/1993 | Inada et al. .................. 152/527 |
| 5,397,527 A | 3/1995 | Rim et al. |
| 5,535,801 A | 7/1996 | Iseki et al. |
| 5,591,933 A | 1/1997 | Li et al. |
| 5,855,704 A | 1/1999 | Reuter |
| 5,945,356 A | 8/1999 | Pott |

* cited by examiner

COMPOSITE COMPRISING ORGANIC FIBERS HAVING A LOW TWIST MULTIPLIER AND IMPROVED COMPRESSIVE MODULUS

This invention was made with United States Government support under Award Number 70NANB5H1077, awarded by National Institute of Standards and Technology. The United States Government has certain rights in the invention.

BACKGROUND OF THE INVENTION

This invention relates to articles or article components having improved combinations of in-plane shear modulus (IPSM) and circumferential tensile modulus which increases resistance to various stresses that arise during use of the article. More particularly, this invention relates to rubber articles, reinforced with non-metallic multifilaments, which are subjected to tensile and shear stresses in use, such as those found for example in belts for tires, and particularly radial tires, and transmission drive belts.

Tires are high performance composites that must: (1) develop longitudinal (circumferential) forces for acceleration and braking; (2) develop lateral forces for cornering; (3) support a vertical load; and (4) provide cushioning. Thus, the tire belt serves to provide stiffness to the tire and thereby contributes significantly to cornering characteristics, footprint deformation (contact with road) and forward motion. Increasing the tensile modulus around the circumference of the tire enhances the efficiency in transmitting the driving force from the axle to the tire and ultimately to the road. As the driver steers the vehicle, cornering forces are generated which subject the contact patch (tire area in contact with a surface, or footprint region), and thus the belt, to in-plane shearing forces. High rigidity of the tire belt allows the tire tread in the footprint region to remain flat and in contact with the road, thereby enhancing cornering and treadwear. The importance of the belt makes it a target for improvement for use in high performance tire applications.

The primary concern for agricultural and off-road tires is how efficiently power is transmitted through the tire. This performance goal is largely impacted by the tire belt's circumferential (or longitudinal) modulus. A high circumferential tensile modulus in the tire belt translates into a high degree of transmitting power from the rotation of the wheel to the forward movement of the vehicle. In maximizing this property of a belt, however, the property of in-plane shear modulus is adversely affected. For passenger tires, that is, tires for use in passenger vehicles in normal day-to-day use, in addition to power transmission, one is very interested in ride comfort, handling and treadwear. Ride comfort is influenced by the out-of-plane bending of the tire belt. Lower out-of-plane bending modulus allows the tire tread to readily envelope road obstructions thereby minimizing transmission of vertical deflection to the tire axle. Handling, such as cornering, is impacted by the tire belt's in-plane bending. As the in-plane shear modulus of a tire belt increases, handling response improves as well. However, one must maintain a desirable level of power transmission therefore the circumferential modulus cannot be allowed to decrease below acceptable levels when optimizing this characteristic. Belt design for passenger tires is therefore different than that for off-road and agricultural tires in its need to optimize a greater number of belt parameters to achieve desirable performance goals.

Angle-ply belt composites for pneumatic tires are typically made by stacking in alternate directions two or more plies of filament-reinforced rubber sheets. The reinforcing filaments are typically unidirectional within a sheet. During the incorporation of these unidirectional plies into the tire, an angle is formed between the reinforcement filaments and the tire circumferential line. This angle is typically 20° to 23°. This conventional manufacture of belt composites yields a belt with cut filament edges that are located along the entire circumferential length of the belt edge. Thus, the individual reinforcing filaments of the angle-ply composite are disconnected, which detracts from the mechanical and fatigue properties of the composite due to the ability of the cut filament ends to undergo independent rather than collective movement. Also, cut cord ends represent material discontinuities resulting in undesirable stress concentrations.

Use of steel wire cord for the reinforcing filament is the most common practice in conventional tire belts. This is so because steel cord has compressive and tensile properties adequate for belt reinforcement. However, due to its low tenacity and high density the weight of steel is a drawback which adversely affects fuel economy. In addition, for optimum performance at high speeds, steel-reinforced belts typically require the use of cap plies, or overlays, wherein low density synthetic filaments overlap the cut steel cord edges thus helping to contain the weighty steel cords and to reduce stress-concentration at the sharp cut edges of the steel cord, thereby extending both tire life and high speed capabilities. The use of cap plies would not be necessary in a tire made with a synthetic filament-reinforced belt, representing a savings in both labor and material costs. In addition, the use of steel-reinforced belts makes tire retreading impractical if the steel is corroded. Further, tire recycling of steel-belted tires is more difficult (due to excessive wear of tire shredding equipment) and generates a high percentage of low-grade crumb rubber (i.e. not guaranteed metal free). Overall steel-belted tire recycling is less cost effective than recycling of synthetic organic filament-belted tires.

Given the many drawbacks of the use of steel for reinforcing tire belts, it is highly desirable to replace steel with lightweight materials as reinforcement. Advantageously, the tensile strength of lightweight, synthetic filaments such as PEN, PET, aramid and nylon, is much better than steel's tensile strength when compared at a given fiber weight. As tires are generally designed to strength, this difference results in less cord per tire when synthetics are used. Disadvantageously, however, such synthetic fibers generally have lower compressive moduli than steel wire, and thus yield composites with lower in-plane shear moduli. The lower in-plane shear modulus of a tire belt is detrimental to both the cornering coefficient and treadwear characteristics of a pneumatic tire.

There are several possible approaches for augmenting belt performance when reinforced with synthetic fibers. Generally these approaches introduce additional plies to the belt and/or a third dimension of reinforcement. The latter approach may include: tacking together the plies of the belt, by stitching the plies together, folding plies, or braiding or interweaving.

U.S. Pat. No. 3,616,832, U.S. Pat. No. 3,854,515 and International Publication WO 98/14336 seek to replace steel cord in tire belts with synthetic material. U.S. Pat. No. 3,616,832 teaches four ply belts with ply angles of 50 to 35°; examples employ 15° ply angles. U.S. Pat. No. 3,854,515 teaches the use of four plies in a belt, all with 30° ply angles to replace a steel belt. The polyester used for reinforcement has a lower polymerization degree than is used in conventional polyester cord in combination with twist restrictions.

International Publication WO 98/14336 teaches the use of polyester with particular cord constructions in belts designed for use in radial carcass tires for heavy duty use, such as off-road tires and agricultural uses. The examples utilize polyethylene terephthalate (PET) fiber and teaches conventional ply angles of 20° in a four ply belt and 15° to 30°, preferably 17° to 23°, in a two ply belt. All three disclosures teach the use of conventional ply angles with synthetic reinforcement material and do not contemplate the lower in-plane shear modulus problem inherent in these tire belts compared to those reinforced with steel.

The use of altered bias ply angles has been applied in the design of drive belts. U.S. Pat. No. 5,211,609 teaches a three ply composite drive belt with two layers having bias plies of approximately 45° to 75° (preferably 70°) with respect to the longitudinal axis of the belt. The bias angles are chosen to balance the lateral forces that affect belt tracking. There is no teaching on the composition of the reinforcing cable, nor is there the suggestion of applying the construction to tire belts.

The use of stitching in laminate composite design has been disclosed, however none of the disclosures teach the beneficial effect on the in-plane shear modulus, or teach or suggest the use of stitching in a tire belt composite. The use of stitching in a composite laminate structure is taught in U.S. Pat. No. 4,331,495 and commonly-assigned U.S. Pat. Nos. 5,185,195; 5,198,280; and 5,591,933. Disclosure '495 has no teaching on the disposition of the reinforcing filaments in adjacent plies, teaches a different stitching pattern, is not intended for a flexible elastomeric composite and does not teach or suggest the benefit of stitching with respect to in-plane shear modulus. Disclosures '195 and '280 employ stitching to secure layers of a penetration resistance article with at least two adjacent paths of stitching being less than 0.125 inch apart. Disclosure '933 teaches a slack stitching process to achieve a desirable level of delamination in a penetration resistant article. "Mechanical Properties of 3-D Composites" by M. Cholakara, B. Z. Jang and C. Z. Wang (ANTEC'89, pp. 1549–1551) teaches the effects of stitching laminates of Kevlar and epoxy resin on damage tolerance by improving interlaminar shear strength. It does not teach unidirectional fiber, teaches no specifics of stitching, does not suggest the use of stitching in tire belt composites, and does not consider the in-plane shear modulus.

Composites employing a folded ply have been taught, for example, in U.S. Pat. No. 5,535,801 which teaches the use of a aromatic polyamide fiber-reinforced ribbon which is 5 to 15 mm wide and is folded to zigzag between the edges of the belt. The patent is silent on cord construction and cord properties for the reinforcement cord, and no specific ply angles are taught. Although the zigzag belt would contain continuous fiber reinforcement with cut cords only at the two ends of the ribbon, it would possess many seams and would be laborious to prepare given the narrow width of the ribbon. U.S. Pat. No. 4,210,189 teaches a belt formed by folding a single, wide ply in which the reinforcement cords traverse the width of the single ply into a structure having three folds and four superimposed plies. Cut cord ends are at either edge of the width of the single unfolded ply and when folded, the cut cord ends are present throughout the circumference of the folded belt structure. The patent is silent on cord construction and cord properties for the reinforcement cord. For use in a radial tire, belt ply angles taught are 0° to 30° and for use in a bias tire, belt ply angles taught are 20° to 55°. U.S. Pat. No. 3,830,276 also teaches a folded belt in which the reinforcement cords are cut and the cut ends are present throughout the circumference of the folded belt structure. A braided structure is taught, for example, in U.S. Pat. No. 4,830,781 which discloses a woven tire reinforcing component for use underlying the thread and at least the sidewall regions of a pneumatic tire. The woven structure is made using a coated continuous cord reinforcement preferably containing a single cord spaced within a rubber coating. The patent is silent on cord construction and cord properties for the reinforcement cord.

Other teachings of composites utilizing polyethylene naphthalate fiber include: Japanese Publication Number 30210-1997 (Feb. 4, 1997); Japanese Publication Number 276704-1996 (Oct. 22, 1996); Japanese Publication Number 310251-1995 (Nov. 28, 1995); Japanese Publication Number 193608-1997 (Jul. 29, 1997); and Japanese Publication Number 142101-1997 (Jun. 3, 1997), and International Publication WO 98/47726.

After extensive research into composite design, this invention resulted in improving the conventional tire belt design by employing only non-metallic reinforcement such that a significantly lighter weight belt was able to have comparable or superior circumferential tensile modulus and in-plane shear modulus when compared to a steel belt. This combination of properties resulted from combining the properties of the synthetic filament cords with novel composite architectures. The critical cord properties include initial tensile modulus and initial compressive modulus.

SUMMARY OF THE INVENTION

The problem to be solved is increasing the in-plane shear modulus of tire belts reinforced with synthetic filaments such as polyethylene naphthalate (PEN) and polyethylene terephthalate (PET) in order to gain the benefits of reduced tire weight, easier retreading, and recycling processes while providing the circumferential tensile modulus and in-plane shear modulus to a level comparable to that of a steel-reinforced tire belt. The problem arises from the inherently low compressive modulus of synthetic organic fibers when compared with steel cord. This problem is solved in the instant invention which is a fiber-reinforced article comprised of at least two plies wherein each of the plies comprises (a) rubber and (b) cord made from melt-spinnable, non-metallic, multifilament fiber, the cord having a twist multiplier of less than or equal to about 375, a stress at 1% strain greater than or equal to about 1.7 grams/denier, and an initial compressive modulus greater than or equal to about 7 grams/denier, and the at least two plies having a fiber orientation angle of greater than or equal to about 23°.

This invention improves critical properties of tire belts reinforced with non-metallic filaments by modifying/ altering the design of the conventional steel-reinforced tire belt such that combinations of these properties can be achieved which are comparable to or superior to the combination found in a conventional steel-reinforced belt.

In one embodiment, the combination of in-plane shear modulus and circumferential tensile modulus is improved by employing non-conventional ply angles in two ply composites.

In a second embodiment, in three- and four-ply composites, an optimal combination of in-plane shear modulus, out-of-plane bending modulus and circumferential tensile modulus is achieved by employing non-conventional ply angles, and also adding additional plies with low cord density and relatively low cord weight to offset any undesirable loss in circumferential tensile modulus. Alternatively, one may combine unidirectional plies of different ply angles and specific ply sequence. More specifically, outer plies of the typical ±23° angle sandwich two plies which have ±45° angle, or outer plies of ±30° sandwich a single ply of about 0° angle. Practice of this embodiment is additionally advantageous in that it does not require any new equipment.

In a third embodiment, superior combinations of circumferential tensile modulus, in-plane shear modulus, and out-of-plane bending modulus are achieved by introducing a third dimension of reinforcement, namely stitching, into the angle plies of a composite. The in-plane shear modulus is comparable to a conventional steel-reinforced belt. More specifically, a non-metallic, flexible reinforcing material, for instance synthetic fibers such as PEN, PET, aramid and nylon, is used to stitch through the thickness of the composite having layers of unidirectional non-metallic filament-reinforced rubber sheets.

In a fourth embodiment of this invention, an uncut edge, continuous reinforcement cord composite is taught. Such a method eliminates cut filament ends along the belt edge, thereby significantly improving tensile and fatigue properties of the resulting composites relative to conventional cut edge composites. This continuous edge may be prepared by folding the belts as taught in U.S. Pat. No. 4,210,189 or by the novel spiral folding method taught herein. Synthetic filament cords are supple and lend themselves to such folding operations. A variation of this embodiment is a braided sleeve which is collapsed to form a two-ply, uncut edge, continuous reinforcement cord composite. A novel splicing method is also taught.

The present invention is advantageous because steel cord is entirely replaced by synthetic fiber without sacrificing tire performance. Further, fuel economy can be positively impacted through weight reduction, tire retreading is made possible, and tire recycling would be less difficult and significantly more profitable.

Other advantages of the present invention will be apparent from the following description, attached drawings, and attached claims.

DETAILED DESCRIPTION OF THE PREFERRED EMBODIMENTS

Figure 1:
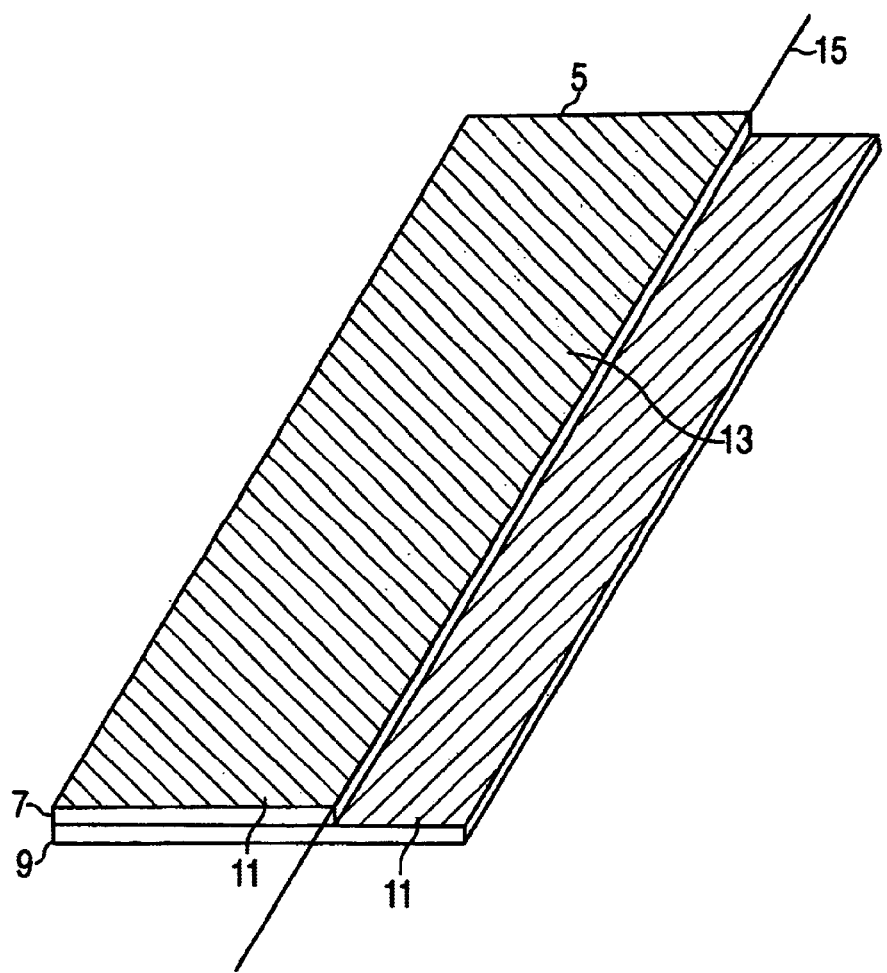
FIG. 1 illustrates a two-ply composite useful in the practice of this invention.

The term "multifilament fiber" as used herein includes yarn, twisted yarn, cord, etc. but excludes large denier (>500 d) monofilament. The term "cord" as used herein can include constructions which have no cord twist and thus have a twist multiplier of zero.

The term "ply" as used herein refers to a single layer in the composite of the invention. A ply may be either continuous or non-continuous with any other ply in the composite. A ply continuous with another ply will have at least one fold in it and if unfolded, would be a single piece of unidirectional fiber-reinforced rubber sheet. Such a ply may also be interwoven with at least one other ply to form a braided structure. Thus, a two ply composite has two layers of unidirectional fiber-reinforced rubber sheets, which sheets may be continuous having at least one fold, or are braided, or non-continuous and, if separated, would be two separate sheets.

"Ply angle" or "orientation angle" as used herein refers to the acute angle formed between the unidirectional reinforcement fibers in the rubber and the circumferential direction of the tire belt, or in a generic composite article, the longitudinal direction of the article.

The phrase "twist multiplier" as used herein is a calculated quantity which reflects the construction of the cord and is related to the helical angle of the constituent twisted yarns, or for twisted yarns, twisted filaments with respect to the axis of the cord. Lowering the twist multiplier results in a lower helical angle. To calculate the twist multiplier, the following equation is used:

$$\text{Twist multiplier} = \text{tpi} \times (\text{TD})^{1/2} \qquad (1)$$

where "tpi" is the turns per inch of the cord twist and "TD" is the total nominal denier of the cord. TD may be calculated by multiplying the yarn denier by the number of yarns used to make the cord, or merely summing the individual constitutive yarn deniers if mixed deniers are used in the cord.

As is well known in the art, increasing twist values can compensate for poor fatigue for a given synthetic yarn. However, higher twist results in lowering both the tensile and compressive moduli which would adversely affect tire belt function. On the other hand, reducing the twist of the cord reduces its fatigue life. PEN yarn has inherently better fatigue resistance than other ultra high modulus synthetic organic yarns such as aramid and has an inherently higher adhesion. Therefore, one is able to reduce twist of PEN cords without dropping the fatigue life to unacceptable levels and without reducing adhesion to unacceptable levels. Thus, the successful use of PEN rather than steel in tire belts is possible by utilizing a low twist to provide a sufficiently high compressive modulus to function effectively in tire belts, while retaining sufficient fatigue life for durability and good adhesion.

For use as the reinforcement cord, PEN is the preferred fiber. However, any melt-spinnable, multifilament fiber may be used, provided the taught cord properties can be met. Melt-spinnable fibers include, for example, polyester such as polyethylene naphthalate (PEN) and polyethylene terephthalate (PET) and liquid crystal polyesters; polyolefinketone (POK); and polyamide such as nylon 4,6 and nylon 6T. The fiber used for reinforcement in the inventive examples was the polyester, polyethylene naphthalate, and for all examples employing PEN fiber, PENTEX™ polyethylene naphthalate fiber supplied by AlliedSignal, Inc. was used. PEN fiber useful for practice of this invention may be either conventional PEN such as that taught in U.S. Pat. No. 3,616,832 or British patent 1,445,464, or dimensionally-stable PEN fiber such as that taught in commonly-assigned U.S. Pat. No. 5,397,527, all of which are incorporated by reference to the extent necessary to complete this disclosure.

Cords useful for the inventive composite have a twist multiplier of less than about 375, more preferably less than about 360 and most preferably less than or equal to about 310. Yarn and cord twisting can be done using any equipment useful, including a ring twister and a direct cabler. A balanced twist, that is, where the ply (yarn) twist is essentially equal to the cable (cord) twist, has been used for the invention examples, but an unbalanced cord twist can be used as the physical properties and fatigue life are dominated by the cable twist, not the yarn ply twist. Yarn denier of about 500 to about 6000 is particularly useful in the invention. The denier per filament is at least about 2 dpf, and preferred is about 5 dpf to about 10 dpf.

Cord dipping for the PEN cords used herein was a conventional double dip treatment which included a predip step using a dip composed of: Aerosol OT (3.6 grams (g)), distilled water (2045 milliliters), gum tragocanth (1.2 g), and Aracast XU-AY-238 Epoxy (150 g), and having 0.7% dip pickup (by weight). The predipped cord was then passed through two ovens under a 6% constant tensile elongation, with the first oven at 300° F. (80 seconds time of residence) and the second oven at 450° F. (40 seconds time of residence). This was followed by a final dip with ammoniated RFL, 5% dip pickup (by weight), then the cord was passed through two ovens and allowed to relax up to 2%. The first oven was at 300° F. (80 seconds time of residence) and the second oven was at 450° F. (60 seconds time of residence).

The cord useful for the invention has a stress at 1% strain of at least 1.7 grams/denier (g/den). The cord useful for the invention also has an initial compressive modulus of at least about 7 g/den, more preferably at least about 9 g/den, and most preferably at least about 9.5 g/den.

The total cord denier and ends per inch (EPI) depends on the tire size, construction, and performance criteria. Today, Finite Element Modeling (FEM) is often used to define the desired tire belt mechanical properties. These belt needs in turn determine the amount and spacing of the cords. As a general rule, the cord denier should be as low as possible to give the thinnest ply (lightest weight) while still providing good belt durability. Close cord spacing enhances the modulus of the composite ply in the direction perpendicular to the cord axes. For angle plies of the present invention, this closer spacing enhances the tensile properties along the circumferential direction of the tire. The fractional distance between the cords may be described by the commonly used "rubber rivet" terminology. "Rubber rivet" is the fractional rubber density perpendicular to the cords axes and can be calculated from $$\text{rubber rivet} = l - (EPI) * (\text{cord diameter}) \quad (2)$$

where cord diameter is measured in inches. For the present invention, in the two-ply composites, including the two-ply continuous edge composites, and in the outer plies of the three- and four-ply composites, a rubber rivet of about 0.10 to 0.25 is preferred. A higher rubber rivet (up to about 0.86) is useful for the inner ply/plies of the three- and four-ply composites, as well as the four-ply continuous edge composites.

In the inventive examples the reinforcement cord was 6000 d, 4×4 having the following properties: twist multiplier was 310, breaking tenacity was 8.3 g/den, initial tensile modulus was 173 g/den, ultimate elongation was 6.4%, stress at 1% strain was 1.7 g/den, stress at 3% strain was 4.4 g/den, and stress at 5% strain was 6.9 g/den.

The composite article may employ any rubber suitable for the desired end use. For use in belts to reinforce pneumatic tires for passenger vehicles, typical tire belt rubber stocks, for instance, comprise natural/SBR (styrene butadiene rubber) rubber blends and sulfur curing agent. The rubber used herein is a commercially-used rubber stock.

In the first embodiment of this invention, two ply belts are constructed using unidirectional fiber-and-rubber composite sheets in which the PEN fiber cord fulfills the previously described parameters. The composite sheets are made using the existing processing method such as conventional tire cord calendering, filament winding, unidirectional composite prepregging, pultrusion, etc. The unidirectional sheet is then bias cut at specific ply angles and two such sheets are laminated to make the two-dimensional laminate of the ±angle ply structure. For the lab-scale samples used herein, this uncured laminate composite is subjected to suitable pressure so that the two plies are consolidated into an integrated multi-ply composite. The final step involves curing the composite by the conventional method of heating to an appropriate, elevated temperature while under pressure for a time long enough to vulcanize (cure) the rubber matrix. Note that in typical tire manufacturing methods, this curing step actually occurs with the belt already assembled in the tire.

FIG. 1 illustrates a two ply belt. In this composite structure 5, the two plies 7 and 9 are adjacent to each other and positioned so that the parallel reinforcement filaments 11 in the first layer are not parallel to the parallel reinforcement filaments 11 in the second layer. The ply angle 13, which is the angle formed between the circumferential axis of the belt 15 and the reinforcing fiber 11 in the composite, is critical to this embodiment. Both plies have the same magnitude ply angle which are balanced by one being positive (ply 9) and one being negative (ply 7). In order to achieve an optimum combination of both in-plane shear modulus and circumferential tensile modulus, that is, a combination comparable to a conventional two ply steel-reinforced belt, the ply angle for the inventive two ply composite is preferably at least about 23° to about 35°, more preferably about 25° to about 35° and most preferably about 26° to about 35°.

Figure 2:
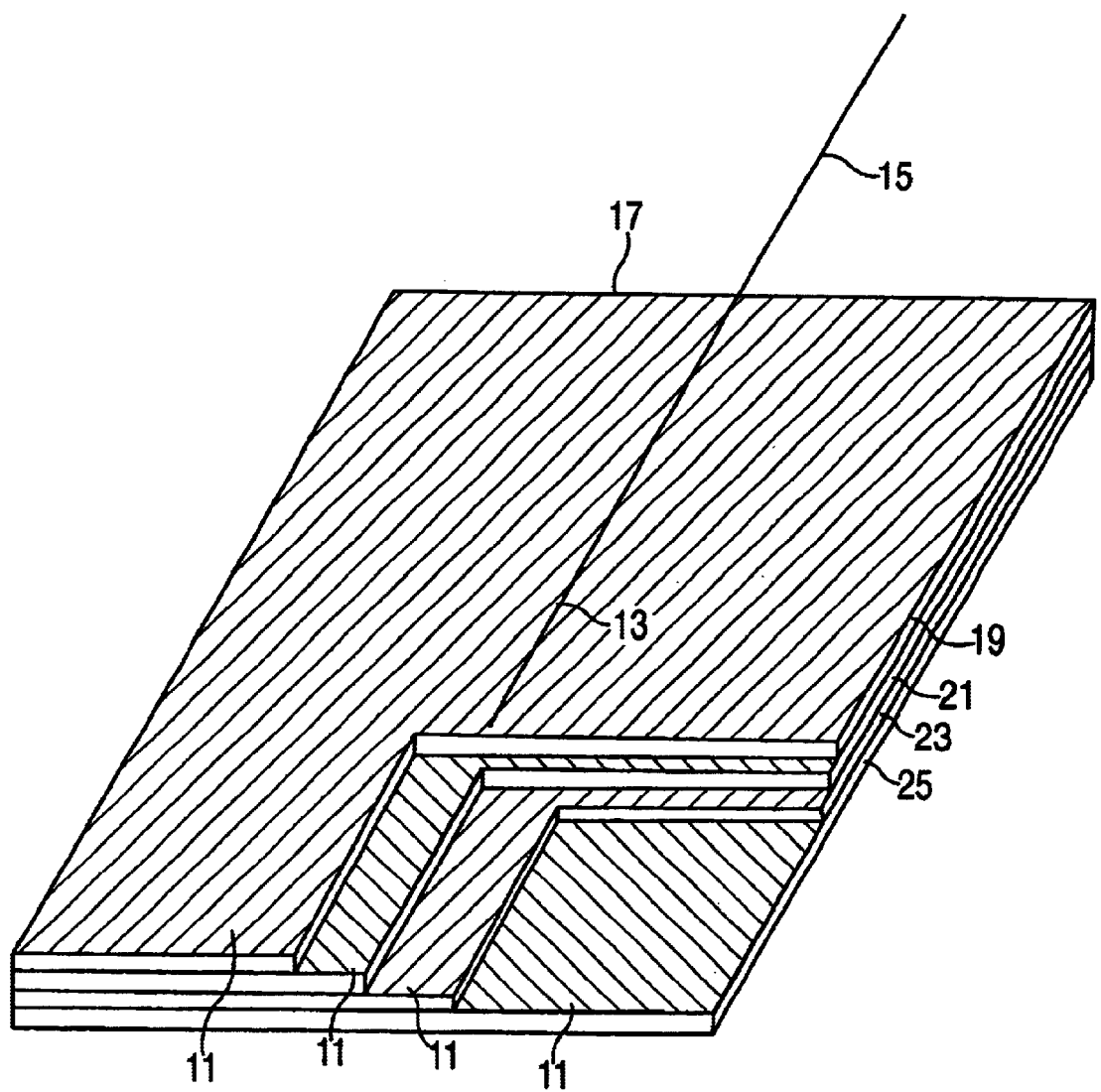
FIG. 2 illustrates a four-ply, different ply-angle composite useful in the practice of this invention.
Figure 3:
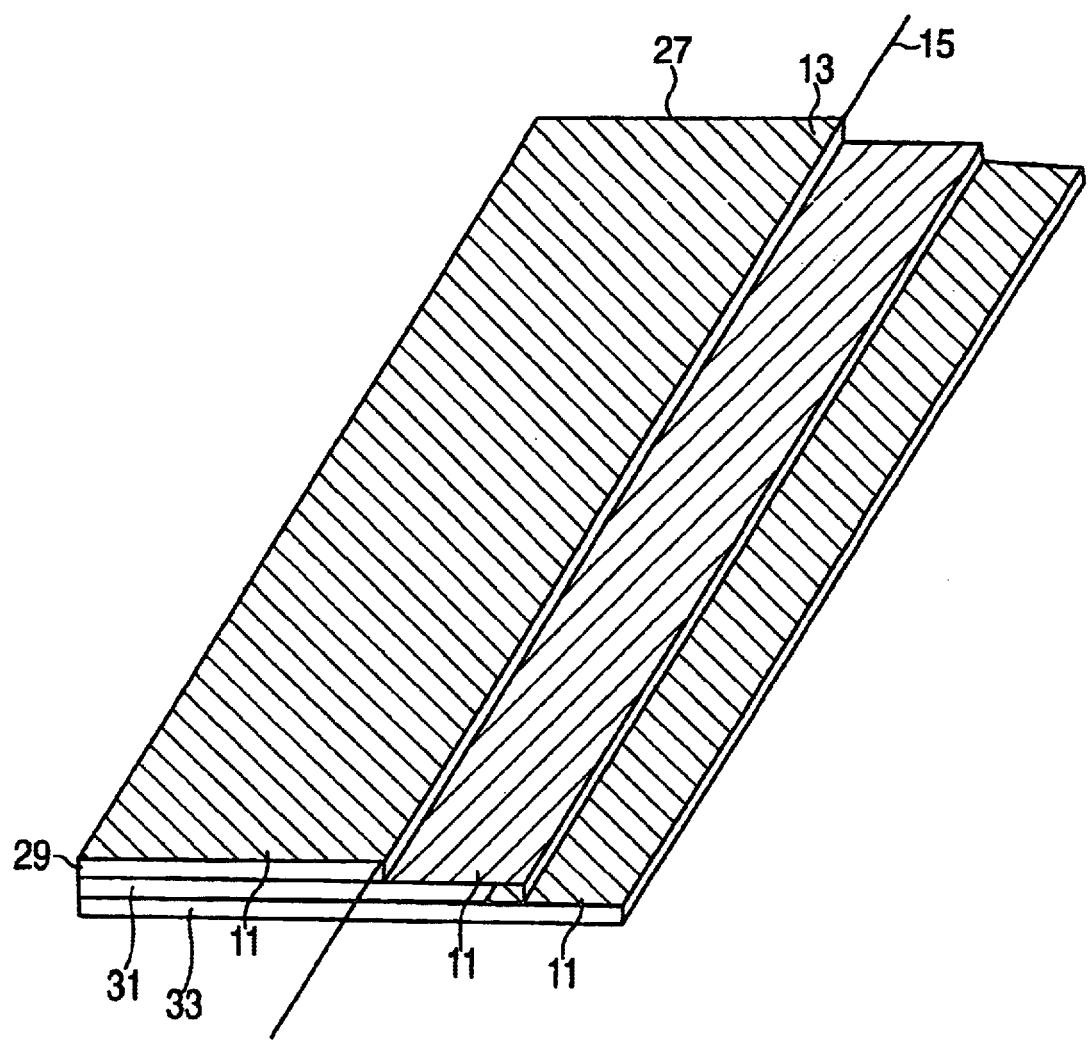
FIG. 3 illustrates a three-ply, different ply-angle composite useful in the practice of this invention.

In the second embodiment of this invention, fabrication of the three- and four-ply composites with combinations of different ply angles starts with the same series of steps as does the two-ply composite. The unidirectional fiber-and-rubber composite sheet is made using the existing processing method such as conventional tire cord calendering, filament winding, unidirectional composite prepregging, pultrusion, etc. The unidirectional composite sheet is then bias cut at specific ply angles and the cut sheets are laminated to make the two-dimensional laminate of the ±angle ply structure. FIGS. 2 and 3 illustrate, respectively, a four ply and a three ply version of this embodiment of the invention.

In FIG. 2, the composite 17 is comprised of four plies 19, 21, 23, and 25. The two outside plies 19 and 25 sandwich the two inside plies 21 and 23. For use in a tire, one of the outside plies 19 or 25 would be the radially-innermost ply with respect to the axis of the tire rotation, and the other outside ply would be the radially-outermost ply and the ply closest to the tread of the tire. Each ply is reinforced with parallel, unidirectional fibers 11. The angle 13 is the acute angle formed by the reinforcing fibers 11 and the circumferential tire (or longitudinal) axis 15 of the composite and is called the ply angle. In this figure, plies 19 and 21 have positive (+) ply angles while plies 23 and 25 have negative (−) ply angles. Although generally, the magnitude of ply angle of each ply in the composite may be varied as long as the condition of symmetry with respect to the circumferential line is satisfied, examples of useful angles include but are not limited to outer plies at ±23° and inner plies at ±45°. For example, orientation angles in these plies can be: +/+/−/− or −/−/+/+ or +/−/−/+ or −/+/+− or +/−/+/− or −/+/−/+, from radially-innermost ply to radially-outermost ply.

In FIG. 3, three ply composite 27 is comprised of two outside plies 29 and 33 and an inner ply 31. For use in a tire, one of the outside plies 29 or 33 would be the radially-innermost ply with respect to the axis of the tire rotation, and the other outside ply would be the radially-outermost ply and the ply closest to the tread of the tire. Each ply is reinforced with parallel, unidirectional fibers 11. The angle 13 is the acute angle formed by the reinforcing fibers 11 and the circumferential tire (or longitudinal) axis 15 of the composite and is called the ply angle. Ply 29 has a negative ply angle and ply 33 has a positive ply angle. The outer plies have non-metallic reinforcement at ply angles of preferably about +23° to 35°. The single inner ply 31 sandwiched between the outer plies 29 and 33 has non-metallic reinforcement at ply angles of about ±0° to 5°, most preferably at about ±0°.

Another embodiment of the invention involves introduction of a third dimension component, namely stitches, into the composites. As with the other embodiments, fabrication of the stitched belt composites involves a series of steps. The rubber composites are assembled and cured as above, except that the uncured assembled composite is stitched prior to curing Stitching of the composite requires a flexible reinforcing material such as synthetic fibers. Steel is unsuitable for stitching in this invention because of its inflexibility. One can use most industrial fibers, such as PEN, PET, nylon, rayon or aramid. Preferred deniers for stitching fibers are 500 to 6000. Stitching fibers should have typical mechanical properties. Stitching of the laminate may be done either by hand or by machine. The stitching holes, which are approximately the same diameter as the stitching cord diameter, may be either prepunched into the laminate before stitching, or formed almost instantaneously with the fiber crossing the thickness of the laminate. The stitching holes are sealed during the final elevated temperature curing during which the rubber flows into them. The stitches are initially made taut, and remain so after curing. It is preferred that the stitching cover the entire surface of the laminate composite to maximize the improved in-plane shear modulus. Stitching of just the cut edges or of a few portions of the belt will reduce delamination however the in-plane shear modulus will not be as improved. It is not necessary to knot the stitching fiber ends. The stitching becomes a permanent part of the composite as a result of the subsequent elevated-temperature curing.

Figure 4:
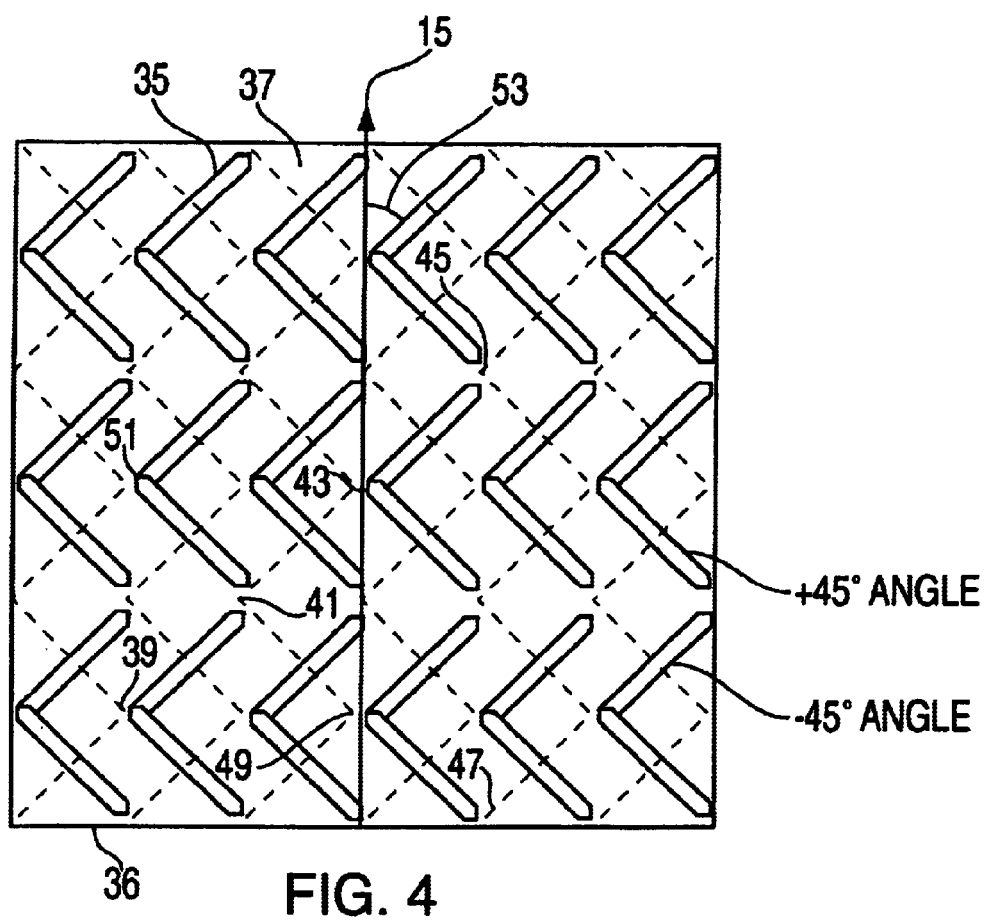
FIG. 4 illustrates a continuous chain stitch pattern useful in practice of this invention.

As for the pattern of stitches used in the first embodiment of this invention, any pattern which results in the improvement of in-plane shear modulus may be used. Several common stitches are preferred and are detailed for the purpose of clarification. The preferred continuous chain stitch is shown in FIG. 4 in which stitch 35 indicated by the solid line is on the front of the laminate composite 36 and stitch 37 indicated by the broken line is on the backside of the laminate composite. Line 15 indicates the orientation of the circumferential axis of the article. The stitching fiber, for example, comes through the composite at point 39, and travels along the front side of the composite and through to the backside at point 41, travels along the backside of the composite and travels back through the composite at point 43 then re-crosses the composite at point 45. Likewise, a stitching fiber comes through the composite at point 47, travels across the surface and through to the backside at point 49, travels along the backside of the composite and travels back through the composite at point 41 and the re-crosses the composite at point 51. This pattern is continued over the entire surface of the composite belt. Angle 53 is discussed below.

Figure 5:
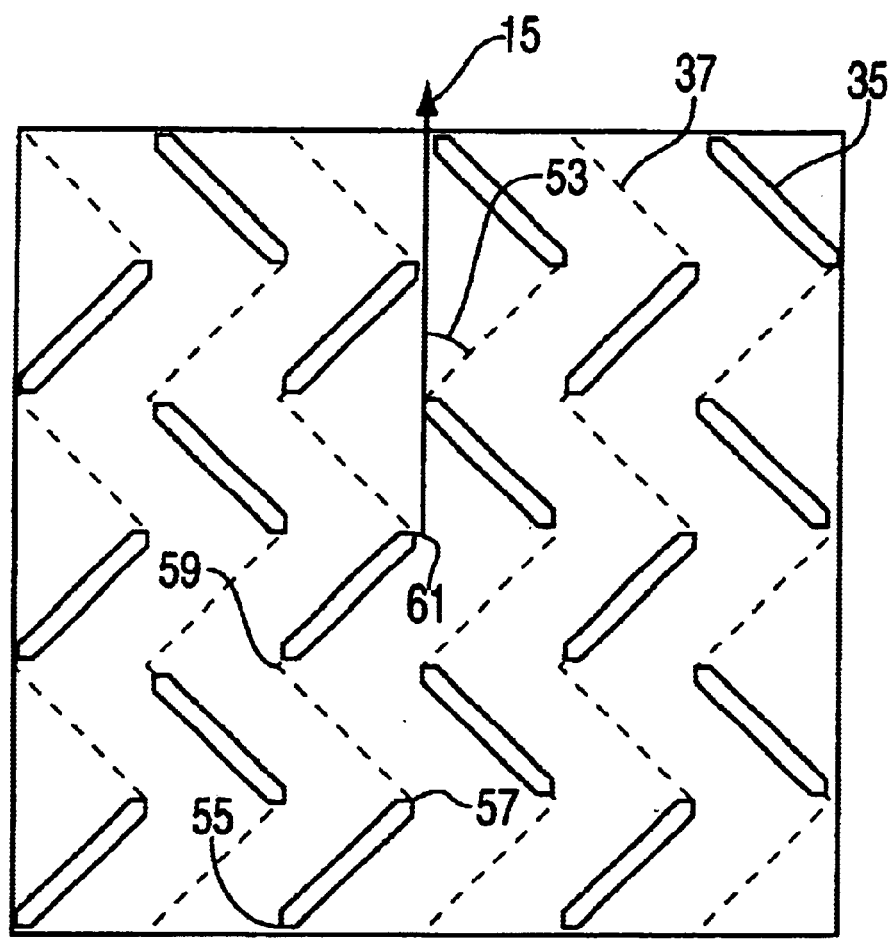
FIG. 5 illustrates a cross-stitch pattern useful in practice of this invention.

The preferred zigzag stitch is shown in FIG. 5. As in FIG. 4, stitch 35 is on the front of the laminate composite and stitch 37 is on the backside. Angle 53 is the angle formed between the stitch and the circumferential axis 15 of the stitched composite. In this zigzag pattern, the fiber goes from point 55 across the front of the composite to point 57 where it crosses the composite to reach the backside, travels then to point 59 where it re-crosses the thickness of the laminate and travels across the front surface to point 61. This pattern is continued over the entire surface of the composite belt.

Figure 6:
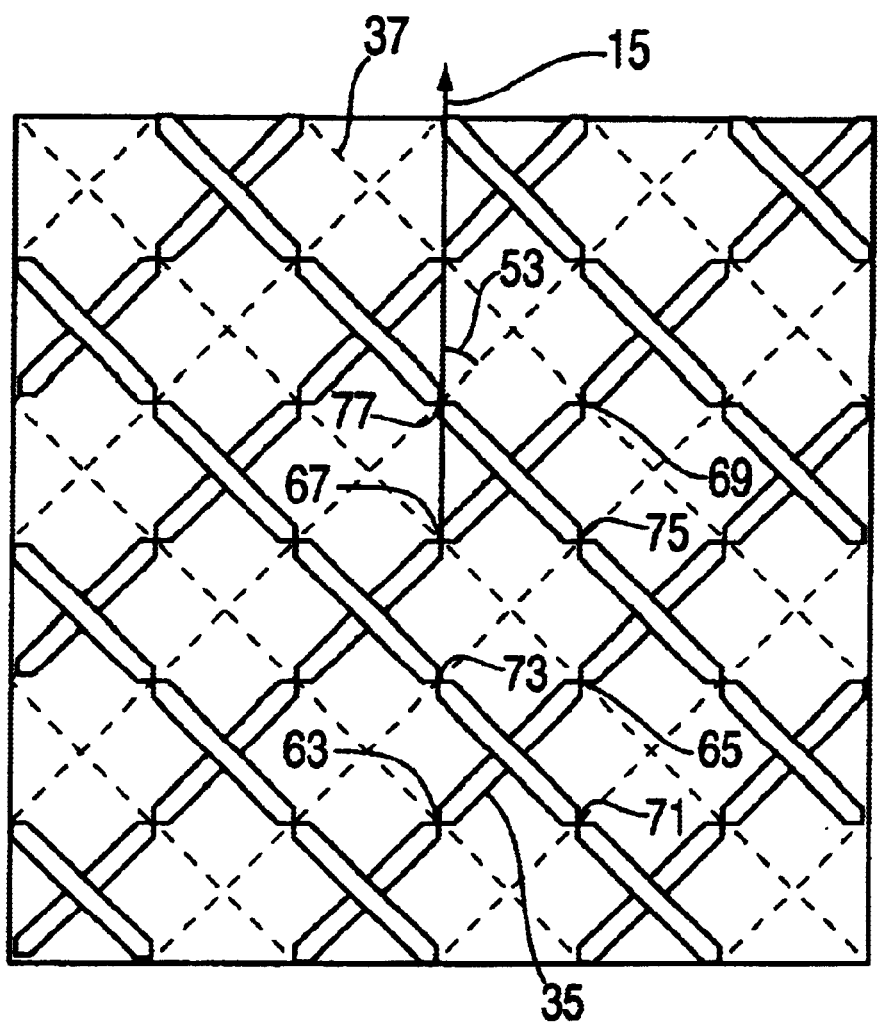
FIG. 6 illustrates a zigzag stitch pattern useful in practice of this invention.

The preferred third stitch pattern, cross stitch, is shown in FIG. 6 and is similar to the zigzag pattern except stitching fibers intersect with each other. Thus, stitching fiber travels from point 63 across the face of the composite to point 65 where it crosses to the backside and travels to point 67 where it re-crosses the composite to come back to the front and then travel to point 69. Similarly, stitching fiber travels from point 71 across the face of the composite to point 73 where it crosses to the backside and travels to point 75 where it re-crosses the composite to come back to the front and then travel to point 77. This pattern is continued over the entire surface of the composite belt. As in FIGS. 4 and 5, stitch 35 is on the front of the laminate composite and stitch 37 is on the backside. Angle 53 is the angle formed between the stitch and the circumferential axis 15 of the stitched composite.

If desired, one may use a combination of all three stitch types. Of the three stitch types, however, the most preferred is the continuous chain stitch, used over the entire surface of the belt. The ply angle useful in the practice of the stitched embodiment ranges from about 23° to 35°, with a preferred range of 23° to 30°, and a most preferred value of 23°.

In the stitching pattern, it is highly preferred that angle 53, the angle formed by a stitch with respect to the circumferential axis 15 of the tire belt (or longitudinal axis for a generic article) is ±45°. At this magnitude of stitch angle 53, the maximum benefit on the improved in-plane shear modulus is achieved. Immediately adjacent parallel rows of stitches are separated most preferably by about 0.35 inches. Thus, stitch density, which is defined as the number of rows of stitches per inch, is preferably about 3 rows per inch. Stitch size, the length of fiber that goes from, for example, point 39 to point 41 in FIG. 4 is most preferably about 0.7 inches. Thus, within a single linear row of stitching, there are about 1.4 stitches per inch.

Figure 7A:
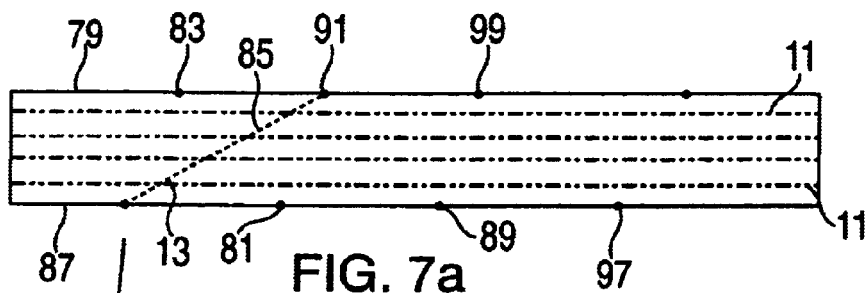
FIG. 7 illustrates a series of folding steps useful in the practice of this invention.
Figure 7B:
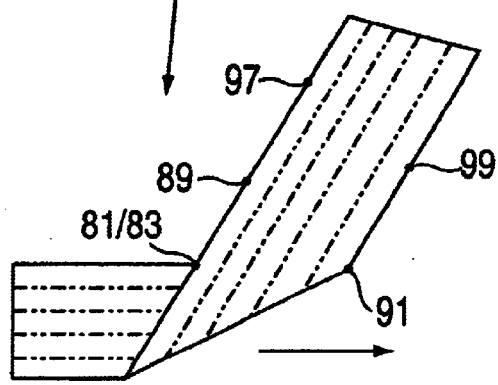
Figure 7C:
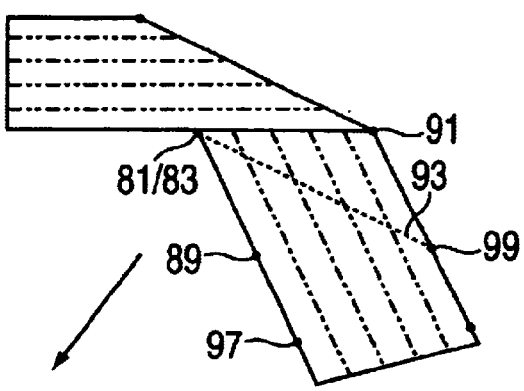
Figure 7D:
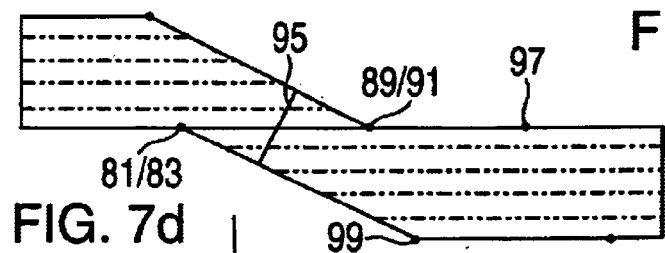
Figure 7E:
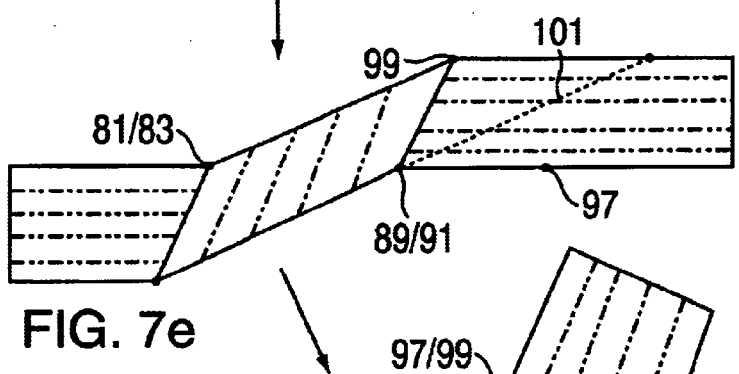
Figure 7F:
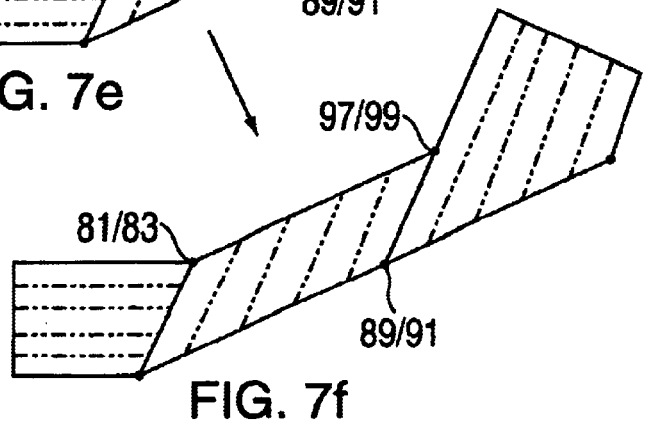

In another embodiment of this invention, fabrication of the composites with uncut edges starts with the same series of steps as does the stitched and different ply angles composites in manufacturing the unidirectional composite sheet. However depending on the folding method employed, the unidirectional composite sheet may or may not be cut to produce specific ply angles. U.S. Pat. Nos. 3,473,594; 3,863,695; and 4,210,189 describe a folded belt concept previously used by the tire industry. The current invention also teaches a new series of folding steps as schematically shown in FIG. 7 which results in a belt with uncut, folded edges and essentially continuous fiber reinforcement at the belt edges. "Essentially continuous" means that there are substantially no free cord ends at the belt outer edges. With reference to FIG. 7a, a fiber-reinforced rubber composite 79 is shown with fiber reinforcement 11 parallel to the longitudinal direction of the sheet. In FIG. 7b, the composite 79 is folded to bring point 81 to point 83 by folding along line 85. The angle 13 between the line 85 and the edge 87 is the resultant ply angle in the folded composite. The once-folded composite is turned over as shown in FIG. 7c and point 89 is brought to point 91 by folding along line 93 as shown in FIG. 7d. The line 95 indicates the width of the tire belt. The twice-folded composite is turned over again as shown in FIG. 7e and point 97 is brought to point 99 by folding along line 101 as shown in FIG. 7f The thrice-folded composite would be turned and folding continued in the same manner until a length of folded composite sufficient to serve a given utility, e.g. a tire belt, is reached. Accordingly, two folds alone may provide sufficient length for a given utility. The folded belt is then cured as described before using pressure and elevated temperature. Folding can be done manually or using any appropriate automated process.

Figure 8:
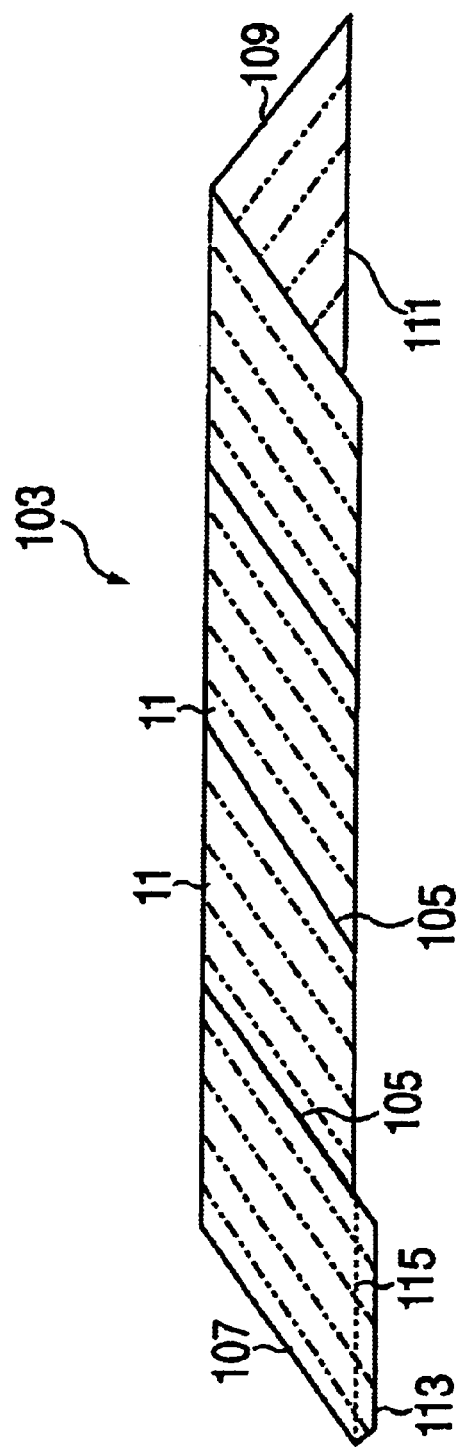
FIG. 8 illustrates a method of splicing a tire belt which does not have cut edges.

A circular-shaped belt is formed from the uncut edge, spiral-folded, two-ply composite 103 by forming a splice between the two ends. A novel splice has been developed as shown in FIG. 8. In this Figure, the reinforcement filaments 11 are parallel to the original edge 105 of the unfolded unidirectional composite sheet. The ends 107 and 109 are single ply so that when overlapped, a two-ply splice is formed with the same thickness as the folded belt regions. The reinforcing cords of the folded belt are cut along one side to form a cut notch 111 in the splice region. To minimize the effect of these cut cords, a flap 113 is included on the other single ply end. The folded composite is bent into an annular shape with single ply end 107 overlaying single ply end 109. Flap 113 is folded along line 115 to fit into the cut notch 111 area. Flap 113 is the reciprocal shape of notch 111 in order to fill the notch 111 completely when flap 113 is folded into notch 111. By so doing, no cut cords are at the edge of the final folded and spliced belt composite. For a four-ply composite, ends 107 and 109 are two-ply so that when overlapped, a four-ply splice is formed with the same thickness as the folded belt regions. In the braided belt, two plies were braided (interwoven) together to form a tubular sleeve. The sleeve was then flattened to yield two essentially planar plies parallel to the longitudinal axis of the tubular sleeve.

The present reinforced article may be used in a reinforced article which requires the improved properties resulting from the invention. Such a use is in a tire belt for a passenger car, or in motorcycle tires. Other uses are in transmission belts, in V-belts, and in conveyor belts.

Testing Methods a. Cords

Initial tensile modulus was measured in accordance with ASTM. Each sample was clamped with the appropriate pretension as specified in ASTM D885. Stress at 1% strain values are taken from the same data used to calculate initial tensile modulus and is calculated using the actual denier of the cord. Stress at 1% strain is related to LASE at 1% strain, where LASE stands for load at specified elongation, but is normalized for the yarn denier.

Initial compressive modulus of the cord was determined using composite specimens based upon Goodrich disk fatigue specimens. Instead of a single cord, five cords were placed within each rubber-filled mold cavity, except the control rubber sample in which no cords were added. The cords were constrained under a minimum tension of about 0.01 g/den during molding of the specimen. Each compression specimen was in the shape of a right prism, approximately 0.49 inches wide, 0.43 inches thick and 1.25 inches long. The top and bottom of each sample were ground to yield parallel surfaces. The compressive modulus was measured by uniaxially compressing a sample between platens at a crosshead speed of 0.5 in/min. Compressive modulus of the composite ($E_{composite}$) was determined using the initial, straight line region of the compressive stress-strain curve (prior to cord/sample buckling) and was calculated using the equation:

$$E_{composite} = \text{slope} \times \text{gauge length/area} \quad (3)$$

where "slope" is the slope of the initial straight line portion of the load-versus-displacement curve, "gauge length" is the initial composite gauge length and "area" is the initial composite cross-sectional area. The cord modulus ($E_{cord}$) was calculated by assuming an iso-strain condition, where the rubber/cord composite modulus ($E_{composite}$) is given by the rule of mixtures, such that:

$$E_{composite} = (V_{cord} \times E_{cord}) + (V_{rubber} \times E_{rubber}) \quad (4)$$

where "E" is the initial compressive modulus and "V" is the volume fraction of that component in the sample. A correction factor was applied to the $V_{cord}$ calculation to take into account empty space within the cord bundle It was assumed that the cord volume was 70% solid and 30% empty space.

b. Composites

Circumferential tensile tests were carried out in accordance with ASTM D3039 on rectangular composite specimens approximately 0.75 inch wide and with a gauge length of 6 inches, yielding a sample aspect ratio (length divided by width) of 8. Samples were evaluated at a constant crosshead speed of 0.2 in/min, on either an Instron 8511 tester running Series IX data collection software, or an Instron 4505 tester, also running Series IX software. Data was collected on a computer connected to the Instron tester via a GPIB interface.

Maximum load is the load at failure as described in ASTM D3039.

Circumferential tensile modulus (labeled as tensile modulus in the tables of example data) was calculated using the following equation:

$$\text{circumferential tensile modulus} = (F/\Delta l) l_o / w_o \quad (5)$$

where "$F/\Delta l$" is the slope of the load displacement curve in the 1%–4% strain range, "$l_o$" is the initial sample gauge length and "$w_o$" is the initial sample width. The resulting units are pounds-force per inch (lbf/in).

In-plane shear modulus (IPSM) testing was carried out in accordance with ASTM D-4255 standard guide for evaluating the in-plane shear properties of composites. The rail shear (method A) was used. For stitched composite samples, tests were conducted on an Instron 4505 tester with Series IX software at constant crosshead speed of 0.2 in/min at room temperature (~23° C.) with relative humidity of 55%. For the different ply angle samples, tests were conducted on an Instron 8511 tester at a constant crosshead speed of 0.2 in/min at ~23° C. temperature and ambient relative humidity. Data was collected on a computer connected to the Instron tester via a GPIB interface. The equation used to calculate IPSM was:

$$IPSM = (F/\Delta w) w_o / 2 l_o \quad (6)$$

where "$F/\Delta w$" is the slope of the shear load vs. displacement curve, "$w_o$" is the initial sample width and "$l_o$" is the initial sample gauge length. The resulting units are lbf/in.

Note that both the tensile modulus and the in-plane shear modulus values are reported herein in pounds-force per inch. Sample thickness was not included in the calculation which eliminates possible underestimation of values due to constraints on available rubber sheet thickness. Composites prepared in this study are thicker than those one would make in a traditional calendering method. Furthermore, the use of this unit is consistent with what is conventionally used in the tire industry.

Out-of-plane bending modulus (OPBM) testing was carried out by a dynamic flexural test using a three (3) point bending geometry utilizing center loading on a simply support beam. The sample was initially displaced 3 mm upon positioning in the device and the total cyclic displacement was 1.4 mm beyond the initial displacement distance. Test frequency was 10 Hz. The sample had a length of about 1.6 inches and a width of about 0.4 inches. Thickness varied from composite to composite. The OPBM was calculated using the following equation:

$$OPBM = (F/\Delta l)/w_o \quad (7)$$

where "$F/\Delta l$" is the slope of the dynamic load vs. displacement curve and "$w_o$" is the initial sample width.

Flexural fatigue testing was carried out on rectangular composite specimens, 10 inches long and 0.75 inches. Specimens were fatigue tested on a Scott compression fatigue tester which is commonly used in the tire industry to evaluate the fatigue and cord adhesion of reinforced rubber composites. Specimens were placed around a 0.5 inch diameter spindle and subjected to a 70 pounds-force (lbf) total load. The specimens were cycled (flexed) at a rate of approximately 266 cycles/minute (~4.4 Hertz) until failure. The total number of cycles until failure, and comments on the failure mechanism, were recorded for each sample.

Data in the tables resulted from testing samples at least twice and the reported values are averages.

EXAMPLES

Comparative Cords A, B, C, D, E, F and G, and Starting Pen Cords 1–6 (for Inventive Examples)

A series of cords was made which varied in polymer composition and cord construction. The intent of the series was to demonstrate the relationship between twist multiplier and cord properties for each polymer type. Comparative Cords A, B and C were made from commercially-available aramid yarn. Comparative Cords D, E and F were made from commercially-available PET yarn. The PEN yarn of Starting PEN Cords 1–6 was made using AlliedSignal's commercially-available PENTEX™ yarn. The initial tensile modulus and initial compressive modulus were measured on each of these cords. These data is presented in Table I, as is the stress at 1% strain.

TABLE I

| Comparative Cord | Starting PEN Cord | Polymer | Cord construction (yarn denier/# of yarns used) | Twist (tpi × tpi) | Twist multiplier | Initial tensile modulus (g/den) | Stress at 1% strain (g/den) | Initial compressive modulus (g/den) |
|---|---|---|---|---|---|---|---|---|
| A | | Aramid | 1500/2 | 0 × 0 | 0 | 466 | 4 | 4.5 |
| B | | Aramid | 1500/2 | 3 × 3 | 164 | 441 | 4 | 4.1 |
| C | | Aramid | 1500/2 | 6.7 × 6.7 | 450 | 257 | 1.9 | 2.7 |
| D | | PET | 1000/2 | 0 × 0 | 0 | 97 | 0.89 | 10.4 |
| E | | PET | 1000/2 | 0 × 3 | 164 | 86 | 0.88 | n.a.[1] |
| F | | PET | 1000/2 | 7 × 7 | 313 | n.a. | n.a. | 7.1 |
| G | | PET | 1000/2 | 9.5 × 9.5 | 425 | 87 | 0.74 | n.a. |
| | 1 | PEN | 1000/1 | 0 × 0 | 0 | 251 | 2.4 | 12 |
| | 2 | PEN | 1000/4 | 0 × 1 | 63 | 216 | 2.1 | n.a. |
| | 3 | PEN | 1000/2 | 3.5 × 3.5 | 157 | 210 | 2 | 11.1 |
| | 4 | PEN | 1000/2 | 4.5 × 4.5 | 201 | 198 | 1.9 | n.a. |
| | 5 | PEN | 1000/2/3 | 4 × 4 | 310 | 173 | 1.7 | 10.2 |
| | 6 | PEN | 1000/2 | 8 × 8 | 358 | 182 | 1.7 | 9.5 |

[1]The abbreviation "n.a." means "not available". The data is not available due to either noncomparable cord treating conditions, or improper or noncomparable sample preparation.

As shown by Comparative Cords A, B and C, aramid cord at low twist multiplier values had high values for initial tensile modulus, however the compressive modulus for these cords is very low. Tire belts made of such cord would likely have both poor treadwear characteristics and poor cornering coefficient, due to the low compressive modulus values. As shown by Comparative Cords D, E, F and G, cords made from PET had good values for compressive modulus but relatively low initial tensile modulus values. Starting PEN Cords 1 through 6 possessed both high levels of initial tensile modulus and excellent values for compressive modulus. Unless stated otherwise, Starting PEN Cord 5, which had a nominal denier of 6000, an actual denier of about 6500 and a dpf of about 7, was subsequently used to make all the rubber and cord composites of the Inventive Examples and Comparative Example A which follow.

Comparative Example A and Inventive Examples 1–6

Figure 9:
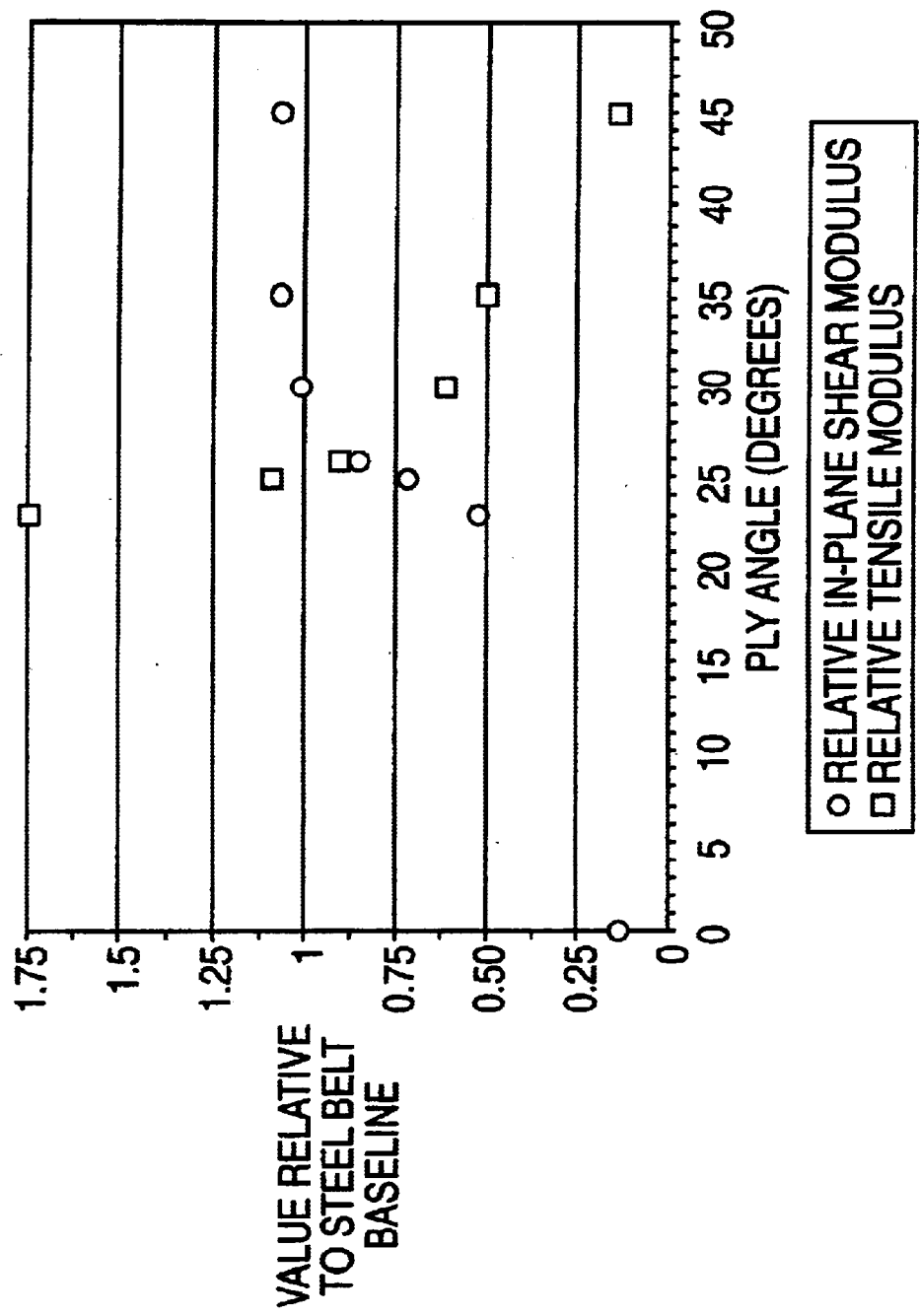
FIG. 9 illustrates the relationship between ply angle and two properties for a two-ply composite.

In Comparative Example A and Inventive Examples 1 through 6, the base rubber-and-fiber composite sheet was the same and was made by laminating unidirectional prepreg sheet of 21 EPI of Starting PEN Cord 5 coated with RFL (resorcinol formaldehyde latex), with a commercially-used tire rubber. To explore the relationships between ply angle and two belt properties key to belt design for passenger tires, in-plane shear modulus and tensile modulus, the following belts were constructed. Each belt was a two-ply, similar to that in FIG. 1, cut edge composite. Each uncured laminate was cured at 150° C. for 30 minutes under 100 psi pressure. The ply angle was varied from 0° to 45°. The data are reported in Table II, using Comparative Example B as the point of comparison. Comparative Example B, data in Table III, is a conventional two-ply steel-reinforced belt at a ply angle of 23°. Table II data are also shown as a graph in FIG. 9 wherein the solid dots are the relative in-plane shear modulus data and the hollow squares are the relative tensile modulus data.

TABLE II

| Comparative Examples | Inventive Examples | Ply angle | Relative In-plane shear modulus[1] | Relative Tensile modulus[1] |
|---|---|---|---|---|
| A | | 0° | 0.14 | n.d. |
| | 1 | 23° | 0.52 | 1.75 |
| | 2 | 25° | 0.72 | 1.09 |
| | 3 | 26° | 0.85 | 0.91 |
| | 4 | 30° | 1.01 | 0.61 |
| | 5 | 35° | 1.07 | 0.5 |
| | 6 | 45° | 1.07 | 0.14 |

[1]Data relative to a conventional steel-reinforced belt having a ply angle of 23°; values greater than indicate that the PEN-reinforced belt exceeded the value for the steel-reinforced belt.

These data clearly showed the general trend that as the ply angle increases, the in-plane shear modulus increases while the tensile modulus decreases. The data also clearly demonstrated that belt angles must be optimized for PEN reinforced composites in order to meet the steel belt baseline requirements and that the optimum PEN belt angles are different than those used for steel.

The data show that, unexpectedly, for the PEN reinforced composite, the optimum bias ply angle with respect to maximizing both the in-plane shear modulus and the tensile modulus is at higher ply angles than the 23° typical for steel belts. For instance, Inventive Examples 2, 3, 4, and 5, which had ply angles of 25°, 26°, 30° and 35°, respectively, possessed reasonable and desirable combinations of in-plane shear modulus and tensile shear modulus. It is reasonable to believe that all angles between 25° and 35° will likewise possess desirable combinations of in-plane shear modulus and tensile modulus. The data also demonstrated that the in-plane shear modulus of a PEN-reinforced composite can exceed the equivalent steel conventional belt when the ply angle is equal to or greater than 30°.

Comparative Example B

Comparative Example B was a 2 ply, steel-reinforced tire belt representative of a typical commercial belt in which the unidirectional reinforcement was oriented ±23°. The steel cord was ~14,000 denier, at 22 EPI per ply. The laminate was cured at the standard tire molding condition to form the final composite structure.

Inventive Examples 7–11

Inventive Example 7 was also a two-ply belt, similar to that in FIG. 1, constructed the same as Inventive Examples 1 through 6 but using Starting PEN Cord 2 at 26 EPI in the unidirectional prepreg sheet. The ply angle was 28°.

Inventive Examples 8 and 9 were both 4-ply composites, similar to that illustrated in FIG. 2, reinforced with RFL-coated Starting PEN Cord 5. In both examples, the outer plies 19 and 25 were ±23° and the PEN cord was at 21 EPI per ply. In both cases, the two sandwiched inner plies 21 and 23 were ±45°. In Inventive Example 8, the PEN reinforcement was at 4 EPI per ply whereas in Inventive Example 9, it was at 8 EPI. In both Inventive Examples, the sequence of plies in constructing the laminate composite was −23°/−45°/+45°/+23°.

Inventive Examples 10 and 11 were three-ply belts, similar to that illustrated in FIG. 3. For Inventive Example 10, the ply angle for the two outer plies 29 and 33 was ±30° and the PEN cord reinforcement was at 21 EPI per ply. The inner ply 31 was approximately 0° with respect to the circumferential axis of the composite and the PEN cord reinforcement was at 4 EPI per ply. Similarly for Inventive Example 11, the ply angle for the two outer plies 29 and 33 was ±30° and the PEN cord reinforcement was at 21 EPI per ply. For the inner ply of Inventive Example 11, the PEN cord reinforcement was 1000/1/3, 5.6×5.6 at 16 EPI. This cord construction has about the same twist multiplier as Starting PEN Cord 5 and therefore has the same initial tensile and initial compressive moduli as that cord. Data for all of these Inventive Examples is in Table III.

Inventive Example 1 was tested for the additional properties listed in Table III.

TABLE III

| Comparative and Inventive Examples | Reinforcement cord | # of plies | Ply angle | EPI per ply | Cured Composite thickness (in) | Maximum load (lbf) | Tensile Modulus (lbf/in) | In-plane shear modulus (lbf/in) | Out-of-plane bending modulus (10[7] dynes/cm × cm width) | Fatigue (# cycles to failure) |
|---|---|---|---|---|---|---|---|---|---|---|
| B | Steel | 2 | ±23° | 22 | 0.098 | 768 | 4187 | 1406 | 2.36 | 2500 |
| 1 | PEN | 2 | ±23° | 21 | 0.108 | 686 | 7234 | 731 | 2.08 | 3600 |
| 7 | PEN | 2 | ±28° | 26 | 0.087 | 342 | 2941 | 1388 | n.d. | n.d. |
| 8 | PEN | 4 | outer: ±23° inner: ±45° | outer: 21 inner: 4 | 0.13 | 580 | 5700 | 1106 | 2.51 | n.d. |
| 9 | PEN | 4 | outer: ±23° inner: ±45° | outer: 21 inner: 8 | 0.140 | 541 | 4900 | 1213 | 2.61 | 2700 |
| 10 | PEN | 3 | outer: ±30° inner: ~0° | outer: 21 inner: 4 | 0.14 | 499 | 4538 | 1291 | 2.39 | 21,100 |
| 11 | PEN | 3 | outer: ±30° inner: ~0° | outer: 21 inner: 16 | 0.124 | 720 | 7071 | 1461 | n.d. | 19,644 |

Inventive Example 1 demonstrated that use of Starting PEN Cord 5 in a typical belt construction results in values for maximum load and OPBM that were comparable to a typical two-ply steel-reinforced belt, Comparative Example B and a tensile modulus and fatigue life that exceeded the conventional steel belt. The in-plane shear modulus was however reduced compared to the conventional steel belt. Inventive Example 7 demonstrated that the IPSM could be made comparable to that of a conventional steel belt by use of PEN cord having a very low twist multiplier of 63 (as reported for Starting PEN Cord 2 in Table I above) in the plies, an increased EPI per ply, and the use of a ply angle of 28°.

From the results summarized in Table III for Inventive Examples 8 through 11, it is seen that the belt composites which are made with additional plies and with various ply angles have IPSM values which approach that of the steel-reinforced composite. Inventive Examples 8 and 9 showed that increasing the EPI of the inner plies in the 4-ply composites yields an increase in IPSM. Further EPI increase in the inner plies is expected to further increase IPSM, exceeding the value of IPSM of the steel-reinforced belt. The practical extent of such increase in EPI is limited only by belt thickness and weight constraints and cord diameter.

Inventive Examples 10 and 11 demonstrated that three-ply composites in comparison to the conventional steel-reinforced belt of Comparative Example B, can have comparable or improved IPSM values, improved circumferential tensile modulus and superior fatigue life when outer plies have a ply angle of 30° and the inner ply has 0°. The increased EPI of the inner ply of Inventive Example 11 increased the maximum load, the circumferential tensile modulus and the IPSM compared to Inventive Example 10.

Inventive Examples 12 Through 15

The effect of simply introducing a third dimension of reinforcement into Inventive Example 1 was explored using stitching. Inventive Examples 12 through 14 were stitched over the entire surface of the composite using the same cord as used for the reinforcement of the rubber, Starting PEN Cord 5. Inventive Example 15 was stitched using PEN cord having a cord construction of 1000/2, 7×7 and an actual denier of 2400. All four Inventive Examples were stitched at 3 rows per inch and the stitches were at a 45° with respect to the circumferential axis of the belt. Inventive Example 12 used a continuous chain stitch similar to that in FIG. 4. Inventive Example 13 used a cross-stitch similar to that in FIG. 6. Inventive Examples 14 and 15 used a zigzag stitch similar to that in FIG. 5. The stitched laminates were then cured at 150° C. for 30 minutes under 100 psi pressure. Three different types of stitching were tested. The data for the stitched composite samples are in Table IV.

The data for Comparative B and Inventive Example 1 are reproduced in Table IV for ease of comparison. In Table IV, n.s. means not stitched.

TABLE IV

| Comparative and Inventive Examples | Reinforcement cord | # of plies | Ply angle | EPI per ply | Stitching pattern | Actual denier of stitching cord | Cured Composite thickness (in) | IPSM (lbf/in) | OPBM ($10^7$ dynes/cm × cm width) | Maximum load (lbf) | Tensile modulus (lbf/in) | Fatigue (# cycles to failure) |
|---|---|---|---|---|---|---|---|---|---|---|---|---|
| B | Steel | 2 | ±23° | 22 | n.s. | n.s. | 0.098 | 1406 | 2.36 | 768 | 4,187 | 2,500 |
| 1 | PEN | 2 | ±23° | 21 | n.s. | n.s. | 0.108 | 731 | 2.08 | 686 | 7,234 | 3,600 |
| 12 | PEN | 2 | ±23° | 21 | Continuous chain | 6500 d | 0.11 | 938 | 1.80 | 613 | 8,445 | n.d. |
| 13 | PEN | 2 | ±23° | 21 | Cross-stitch | 6500 d | 0.139 | 850 | 1.81 | 542 | 5,744 | 5,611 |
| 14 | PEN | 2 | ±23° | 21 | Zigzag | 6500 d | 0.135 | 869 | 1.49 | 502 | 5,287 | 6,584 |
| 15 | PEN | 2 | ±23° | 21 | Zigzag | 2400 d | 0.130 | 869 | 1.76 | 536 | 5,293 | n.d. |

As the data in Table IV demonstrate, stitching of PEN-reinforced belt composites can significantly improve IPSM over that of the belt made with only PEN reinforcement in the rubber sheets. For instance, a minimum improvement of 16% over the unstitched PEN-reinforced Inventive Example 1 may be achieved using the cross-stitch pattern. Stitch pattern influences the extent of IPSS improvement to some extent as demonstrated by Inventive Examples 12, 13, and 14. Comparison of Inventive Examples 14 and 15 demonstrated that the variation of denier of the stitching fiber did not have an impact on this effect. It was also observed that the stitched belts had reduced delamination of the composite plies, a common fatigue-related problem in tire belts of conventional design. Reduced delamination is beneficial because delamination is a common failure mechanism for tire belts.

Inventive Examples 16–19

Folding at the belt edge as a third dimension of reinforcement was tested by avoiding cutting of reinforcement cord by introducing folding into two-ply belts which were otherwise identical to Inventive Examples 3 and 4. The resulting folded two-ply belts were Inventive Examples 16 and 17. A four-ply folded belt architecture was also tested in Inventive Example 8. Inventive Example 19 is a two ply wherein folds are introduced by braiding.

In the folded belts, the reinforcement cord of the composite was not cut in the process of constructing the belt. These constructions were achieved by a performing a unique series of folding operations on a unidirectional fiber-reinforced rubber sheet. The folding operation is illustrated in part in FIG. 7. In the braided belt, two plies were braided (interwoven) together to form a tubular sleeve. The sleeve was then flattened to yield two essentially planar plies parallel to the longitudinal axis of the tubular sleeve.

Table V summarizes the belt constructions and the mechanical and fatigue data is in Table VI. Inventive Examples 3 and 4 were tested for the additional properties listed in Table VI. Comparative Example B is also presented in Tables V and VI for ease of comparison. In Table VI, n.d. means not determined.

TABLE V

| Comparative Example | Inventive Examples | Reinforcing cord type | Cord construction | EPI per ply | # of plies | Ply angle |
|---|---|---|---|---|---|---|
| B | | Steel | (~14,000 denier tire cord) | ~22 | 2 | 23° |
| | 3 | PEN | 1000/2/3 4x4 | 21 | 2 | 26° |
| | 16 | PEN | 1000/2/3 4x4 | 21 | 2 | 26° |
| | 4 | PEN | 1000/2/3 4x4 | 21 | 2 | 30° |
| | 17 | PEN | 1000/2/3 4x4 | 21 | 2 | 30° |
| | 18 | PEN | 1000/2/3 4x4 | 14 | 4 | 30° |
| | 19 | PEN | 1000/2/3 4x4 | 21 | 2 | 30° |

TABLE VI

| Comparative Example | Inventive Example | Tensile Modulus (lbf/in) | Maximum load (lbf) | IPSM (lbf/in) | OPBM ($10^7$ dyn/cm × cm width) | Fatigue (# cycles to failure) |
|---|---|---|---|---|---|---|
| B | | 4,187 | 768 | 1406 | 2.36 | 2,500 |
| | 3 | 3802 | 479 | 1197 | 1.69 | 14,600 |
| | 16 | 18,584 | 2,027 | n.d. | 1.34 | >130,000 (no failure) |
| | 4 | 2,536 | 363 | 1417 | 1.52 | 3,157 |
| | 17 | 5,952 | 1,804 | 1063 | 1.0 | >130,000 (no failure) |
| | 18 | 10,455 | 2,463 | 1306 | 3.98 | 37,841 |
| | 19 | 7340 | 2170 | 833 | 2.32 | 15,625 |

The data in Table VI illustrate the effect of a continuous edge belt composite on mechanical and fatigue properties. Inventive Examples 3 and 16 were identical in constituent materials but differed in construction: Inventive Example 3 had cut edges and therefore cut reinforcement fibers whereas Inventive Example 16 had non-cut edges and continuous reinforcement fibers. As shown in Table VI, the tensile strength and tensile modulus were dramatically increased in the uncut edge composite (Inventive Example 16) relative to the cut edge composite (Inventive Example 3). The fatigue endurance of Inventive Example 16, which did not fail during the flexural fatigue test, was dramatically higher compared with Inventive Example 3. Inventive Example 17 and Inventive Example 4 likewise were identical in constituent materials but differed in construction. Again, the beneficial effect of uncut edges and continuous fiber reinforcement was clear in comparing values of tensile modulus, tensile strength and flexural fatigue life for these two examples. One clear reason for the improved tensile strength and fatigue endurance properties exhibited by the uncut edge composites was that their failure mechanism was fiber fracture rather than failure due to shear: the uncut edge composite of the Invention fails by reinforcement fracture whereas the corresponding cut edge composites fail by matrix shear with no fracture of the reinforcing cords.

In Inventive Example 18, one sheet of 14 EPI unidirectional fiber-reinforced rubber was laid directly over a second sheet of the same unidirectional-fiber reinforced rubber, and this was then treated as one unit during the folding operation as in FIG. 7 using a ply angle of 30°. The net result was 28 EPI in each ply angle direction (+ or −), in contrast to the 21 EPI in each ply angle direction of Inventive Examples 16 and 17. The IPSM increased for this Inventive Example 18, as did the tensile modulus, tensile strength and flexural modulus in comparison to Inventive Example 17, which had only 21 EPI in each ply angle direction and had a ply angle of 30°.

Inventive Example 19, which was similar to Inventive Example 17 in being a two ply composite with 21 EPI per ply of Starting PEN Cord 5 and a ply angle of 30°, was a braided architecture. It was improved in both tensile modulus and maximum load compared to Inventive Example 17 and steel-reinforced Comparative Example B, and had improved fatigue life compared to Comparative Example B. However, the IPSM of Inventive Example 19 was not as improved as that of Inventive Example 17.

Tensile and shear properties vary with reinforcing cord ply angle. This was shown, for instance, in Table II and FIG. 9 for a two-ply composite. Generally, as the ply angle increases between 0° and 45°, tensile modulus decreases while in-plane shear modulus increases. As a result, the ply angle in a conventional cut edge steel belt has a typical value of 23° in order to balance these opposing changes. At a ply angle of 26°, Inventive Example 3, a cut edge belt reinforced with non-metallic multifilament fiber is fairly close to meeting both the tensile modulus and the in-plane modulus of the steel belt. Increasing the ply angle to about 30° in Inventive Example 4 increases the in-plane shear modulus, however also results in the tensile modulus falling to a lower level. Through the use of an uncut edge composite construction as in Inventive Examples 16 and 17, the bias angle could be increased to 30° to improve the in-plane shear modulus and simultaneously exceed the steel belt tensile modulus of Comparative Example B. Therefore, through the use of uncut edge continuous fiber composites formed by folding a unidirectional synthetic organic fiber-reinforced rubber sheet, belt composites can be prepared having high bias angles to achieve both desirable high in-plane shear modulus and more than adequate tensile properties. These Inventive Examples also achieve extraordinary flexural fatigue resistance compared to the conventional steel-reinforced belt design (Comparative Example B).

The practice of the instant invention provides a reduction in weight of a tire belt compared to a conventional steel-reinforced belt, providing an opportunity to reduce tire weight overall with its attendant advantages. In Table VII, representative data of such weight reduction is presented.

TABLE VII

| Example | Weight of Cord in belt plies (lb) | Weight of cord in cap plies (lb) | Weight of cord due to stitching (lb) | Total cord weight in Example (lb) | % reduction from steel-reinforced belt |
| --- | --- | --- | --- | --- | --- |
| Comparative Example B | 2.36 | 0.41 | 0 | 2.77 | — |
| Inventive Example 8 | 0.98 | 0 | 0 | 0.98 | 65% |
| Inventive Example 10 | 0.98 outer plies and 0.39 inner plies | 0 | 0 | 1.37 | 51% |
| Inventive Example 11 | 0.98 main and 0.2 midply | 0 | 0 | 1.18 | 57% |
| Inventive Example 12 | 0.98 | 0 | 0.14 | 1.12 | 60% |

What is claimed is:

1. A fiber-reinforced article comprised of at least two plies wherein each of said plies comprises (a) rubber and (b) cord made from melt-spinnable, non-metallic, multifilament fiber, said cord having
   a twist multiplier of less than or equal to about 375,
   a stress at 1% strain greater than or equal to about 1.7 grams/denier, and
   an initial compressive modulus greater than or equal to about 7 grams/denier, and
   said at least two plies having a ply orientation angle of greater than or equal to about 26° with respect to the longitudinal direction of the article.

2. The article of claim 1 wherein said twist multiplier is less than or equal to about 310.

3. The article of claim 1 wherein said initial compressive modulus is greater than or equal to about 9 grams per denier.

4. The article of claim 1 wherein said at least two plies are three plies, wherein two plies have said ply orientation angle of about 30° and the third ply has a ply orientation angle of about 0°.

5. The article of claim 4 wherein said third ply has said cord at 4 to 20 ends per inch.

6. The article of claim 1 comprising four plies wherein two plies have said fiber orientation angle of about 26° and two plies have a fiber orientation angle of about 45°.

7. The article of claim 6 wherein said two inner plies have said cord at 4 to 20 ends per inch.

8. The article of claim 1 wherein said cord is made from polyethylene naphthalate.

9. A tire comprising a belt which belt comprises the article in accordance with claim 8.

10. A tire comprising a belt which belt comprises the article in accordance with claim 1.

11. The article of claim 1 having fiber reinforcement in a third dimension.

12. The article of claim 11 wherein said third dimension of reinforcement comprises folds.

13. The article of claim 1 wherein said cord further comprises said cord having a denier per filament of greater than or equal to about 2.

14. The article of claim 1 said cord further comprises said cord having an initial tensile modulus of at least about 165 grains per denier.

15. The article of claim 1 wherein said article has an in-plane shear modulus of at least about 730 pounds-force per inch.

16. The article of claim 1 wherein said article has an in-plane shear modulus of at least about 830 pounds-force per inch.

17. The article of claim 1 wherein said article has a fatigue of at least about 2700 cycles to failure.

18. The article of claim 1 wherein said article has a fatigue of at least about 5550 cycles to failure.

19. The article of claim 1 wherein said article is a tire belt.

20. A fiber-reinforced article comprised of at least two plies wherein each of said plies comprises (a) rubber and (b) cord made from melt-spinnable, non-metallic, multifilament fiber, said cord having
   a twist multiplier of less than or equal to about 375,
   a stress at 1% strain greater than or equal to about 1.7 grams/denier, and
   an initial compressive modulus greater than or equal to about 7 grams/denier, and
   said at least two plies having a ply orientation angle of greater than or equal to about 23° with respect to the longitudinal direction of the article; and having fiber reinforcement in a third dimension, wherein said third dimension of reinforcement comprises folds; and
   wherein said folds form the edges of the longitudinal direction of the article.

21. A fiber-reinforced article comprised of at least two plies wherein each of said plies comprises (a) rubber and (b) cord made from melt-spinnable, non-metallic, multifilament fiber, said cord having
   a twist multiplier of less than or equal to about 375,
   a stress at 1% strain greater than or equal to about 1.7 grams/denier, and
   an initial compressive modulus greater than or equal to about 7 grams/denier, and
   said at least two plies having a ply orientation angle of greater than or equal to about 23° with respect to the longitudinal direction of the article; and having fiber reinforcement in a third dimension; wherein said third dimension of reinforcement comprises folds; and
   wherein said third dimension is formed by braiding.

22. A fiber-reinforced article comprised of at least two plies wherein each of said plies comprises (a) rubber and (b) cord made from melt-spinnable, non-metallic, multifilament fiber, said cord having
   a twist multiplier of less than or equal to about 375,
   stress at 1% strain greater than or equal to about 1.7 grams/denier, and
   an initial compressive modulus greater than or equal to about 7 grams/denier, and
   said at least two plies having a ply orientation angle of greater than or equal to about 23° with respect to the longitudinal direction of the article; and
   wherein said article has substantially no cut cord ends along its longitudinal edges.

23. A fiber-reinforced article comprised of at least two plies wherein each of said plies comprises (a) rubber and (b) cord made from melt-spinnable, non-metallic, multifilament fiber, said cord having
   a twist multiplier of less than or equal to about 375,
   a stress at 1% strain greater than or equal to about 1.7 grams/denier, and an initial compressive modulus greater than or equal to about 7 grams/denier, and said at least two plies having a ply orientation angle of greater than or equal to about 23° with respect to the longitudinal direction of the article;

the article further having fiber reinforcement in a third dimension, wherein said third dimension of reinforcement comprises stitches or folds, and wherein when folds are present, said folds form the edges of the longitudinal direction of the composite.

24. A fiber reinforced article comprised of at least two plies wherein each of said plies comprises (a) rubber and (b) cord made from melt-spinnable, non-metallic, multifilament fiber, said cord having a twist multiplier of less than or equal to about 375, a stress at 1% strain greater than or equal to about 1.7 grams/denier, and an initial compressive modulus greater than or equal to about 7 grams/denier, and said at least two plies having a ply orientation angle of greater than or equal to about 23° with respect to the longitudinal direction of the article;

the article further having fiber reinforcement in a third dimension, wherein said third dimension of reinforcement comprises braiding.

25. A fiber-reinforced article comprised of at least two plies wherein each of said plies comprises (a) rubber and (b) cord made from melt-spinnable, non-metallic, multifilament fiber, said cord having a twist multiplier of less than or equal to about 375, a stress at 1% strain greater than or equal to about 1.7 grams/denier, and an initial compressive modulus greater than or equal to about 7 grams/denier, and said at least two plies having a ply orientation angle of greater than or equal to about 23° with respect to the longitudinal direction of the article, and wherein said article has substantially no cut cord ends along its longitudinal edges.

26. A method of making a tire comprising the step of:

incorporating a fiber-reinforced article therein, which fiber-reinforced article is comprised of at least two plies wherein each of said piles comprises (a) rubber and (b) cord made from melt-spinnable, non-metallic, multifilament fiber, said cord having a twist multiplier of less than or equal to about 375, a stress at 1% strain greater than or equal to about 1.7 grams/denier, and an initial compressive modulus greater than or equal to about 7 grams/denier, and said at least two plies having a ply orientation angle of greater than or equal to about 26° with respect to the longitudinal direction of the article.

27. A method of making a fiber reinforced article said fiber-reinforced article comprised of at least two plies wherein each of said plies comprises (a) rubber and (b) cord made from melt-spinnable, non-metallic, multifilament fiber, said cord having a twist multiplier of less than or equal to about 375, a stress at 1% strain greater than or equal to about 1.7 grams/denier, and an initial compressive modulus greater than or equal to about 7 grams/denier, and said at least two plies having a ply orientation angle of greater than or equal to about 23° with respect to the longitudinal direction of the article;

said article having fiber reinforcement in a third dimension wherein said third dimension of reinforcement comprises folds and wherein said folds form the edges of the longitudinal direction of the article; the method comprising the step of:

folding a unidirectional composite sheet in a spiral manner to produce a composite having continuous fiber reinforcement and uncut, folded edges.

28. A method of forming an annular object comprising the steps of:

forming a fiber-reinforced article comprised of at least two plies wherein each of said plies comprises (a) rubber and (b) cord made from melt-spinnable, non-metallic, multifilament fiber, said cord having a twist multiplier of less than or equal to about 375, a stress at 1% strain greater than or equal to about 1.7 grams/denier, and an initial compressive modulus greater than or equal to about 7 grams/denier, and said at least two plies having a ply orientation angle of greater than or equal to about 23° with respect to the longitudinal direction of the article;

said article of claim 1 having fiber reinforcement in a third dimension wherein said third dimension of reinforcement comprises folds and wherein said folds form the edges of the longitudinal direction of the article;

folding the article into a ring shape, overlapping the ends of said article, causing one of said ends to have a notch and the second of said ends to have a reciprocal flap, and folding said flap into said notch, wherein said annular object has no cut cord ends along its circumferential edges.

* * * * *